(No Model.)
N. CLUTE.
FENCE POST.
No. 244,112.  Patented July 12, 1881.
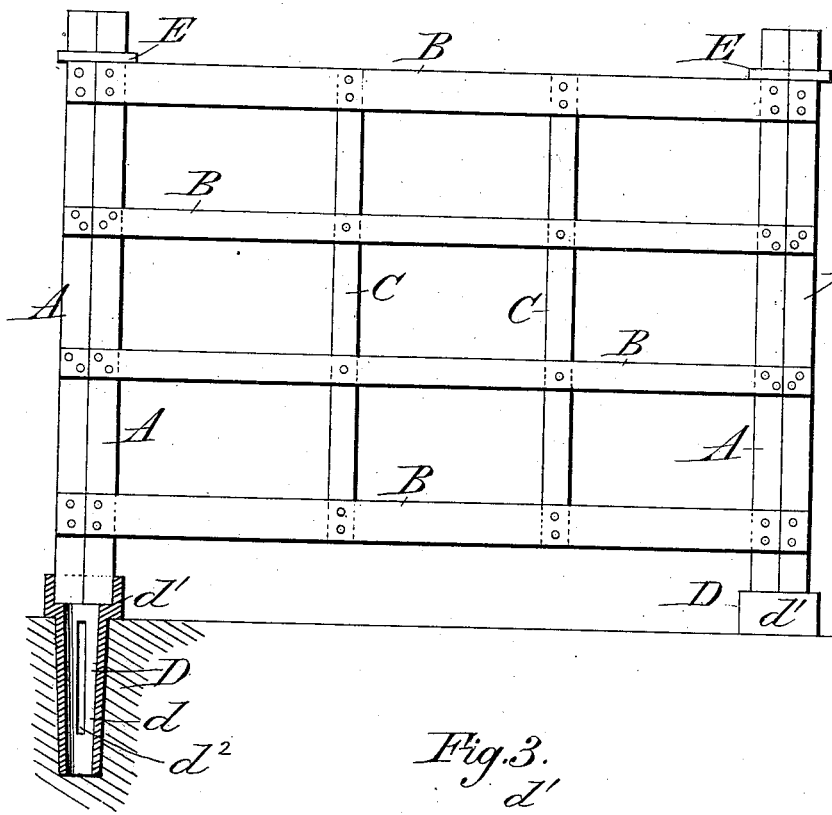
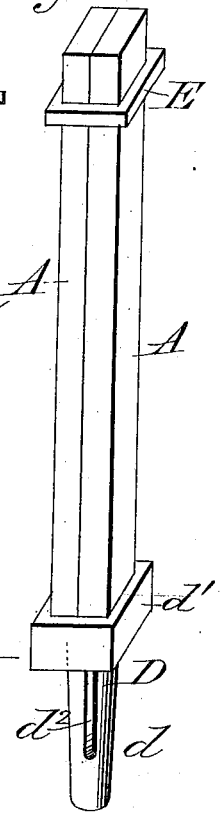
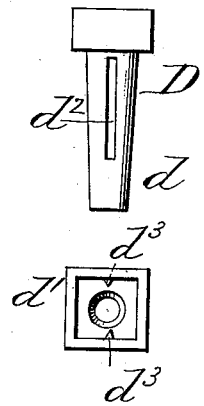
Attest:
H. H. Schott
N. R. Brown
Inventor:
Nicholas Clute
by J. A. Tasker atty.

UNITED STATES PATENT OFFICE.

NICHOLAS CLUTE, OF SCHENECTADY, NEW YORK.

FENCE-POST.

SPECIFICATION forming part of Letters Patent No. 244,112, dated July 12, 1881.

Application filed June 1, 1881. (No model.)

*To all whom it may concern:*

Be it known that I, NICHOLAS CLUTE, a citizen of the United States, residing at Schenectady, in the county of Schenectady and State of New York, have invented certain new and useful Improvements in Fences; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in devices for setting a fence, the object being to provide a perforated socket or tube for the reception of the fence-posts, the fence being constructed in sections or panels connected below by said sockets and above by collars, caps, or bands; and the invention consists in the construction and arrangement of parts, as hereinafter more fully described and claimed.

In the annexed drawings, Figure 1 is a vertical elevation of a fence-panel, showing one of the slotted or perforated sockets in section. Fig. 2 is a perspective view of fence-post and socket, and Fig. 3 is an elevation and plan or top view of a socket.

Like letters indicate like parts in all the figures.

My improved fence is composed of panels which consist of the posts or uprights A A, connected by horizontal pieces B B, that are braced by the vertical pieces C C. This frame or panel may serve as a support for a board covering, if it is desired to make a close fence, or for an ornamental picket or wire covering.

In order to facilitate the setting of the post A, I provide tapering metallic sockets D, which consist of a slotted shank or tube, $d$, having a shoulder supporting a box or casing, $d'$, for the reception of the fence-posts. The upper part of the socket D or box $d'$ is preferably rectangular in form, to correspond with the shape of the posts, but may be varied according to the form of posts employed. Its lower portion or tube, $d$, which communicates with the casing $d'$, is preferably cylindrical in form, tapering gradually to its lower end, which is open, and has in its side one or more slots or openings, $d^2$, that may be made of any size or form desired. The object of this tube, with its open ends and perforations, is to permit the escape of moisture and prevent the expansion of the tube when filled with frost without danger of injury therefrom to the socket.

When setting a fence the sockets D are placed in suitable openings made in the soil of a depth equal to the length of the tube, the box or casing for the reception of the fence-posts being above the level of the ground and resting upon the shouldered portion of the bracket. This casing is of sufficient size to receive and hold the end uprights or posts of two adjoining fence-panels, said posts being further secured or bound together at their upper ends by a strap or collar, E.

Instead of connecting the posts by means of a collar, a suitable cap-piece may be used, so formed as to fit over the top of the adjoining posts; or said posts may be connected by a bolt or any equivalent device.

In order to assist in holding the posts A within the box or casing $d'$, the latter may be provided internally with flanges $d^3$, placed at the center on opposite sides, so as to act as guides, by means of which each post will be held firmly and independent of the other.

The advantage of this construction will be apparent, as a fence may thereby be readily set up or removed in sections, to afford a passage at any desired point, without disturbing or affecting the stability of the remaining portion.

Having thus described my invention, what I claim, and desire to secure by Letters Patent, is—

In a sectional fence, the combination of the adjoining posts A A, connecting-collars E E, and sockets D, composed of a perforated tube, $d$, open at both ends, and provided at its upper end with a box or casing, $d'$, having internal flanges, $d^3$, substantially as and for the purpose set forth.

In testimony whereof I affix my signature in presence of two witnesses.

NICHOLAS CLUTE.

Witnesses:
PHILIP MAURO,
F. H. SCHOTT.